United States Patent
Briglia et al.

(10) Patent No.: US 9,410,738 B2
(45) Date of Patent: Aug. 9, 2016

(54) METHOD AND APPARATUS FOR PRODUCING CARBON MONOXIDE BY CRYOGENIC DISTILLATION

(75) Inventors: Alain Briglia, Corze (FR); Arthur Darde, Paris (FR); Natacha Haik-Beraud, Champigny-sur-Marne (FR); Marie-Khuny Khy, Shanghai (CN)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1150 days.

(21) Appl. No.: 12/525,349

(22) PCT Filed: Jan. 30, 2008

(86) PCT No.: PCT/FR2008/050147
§ 371 (c)(1),
(2), (4) Date: Oct. 7, 2009

(87) PCT Pub. No.: WO2008/099123
PCT Pub. Date: Aug. 21, 2008

(65) Prior Publication Data
US 2010/0047150 A1    Feb. 25, 2010

(30) Foreign Application Priority Data
Feb. 1, 2007    (FR) .................................... 07 53001

(51) Int. Cl.
*C01B 31/18* (2006.01)
*F25J 3/02* (2006.01)

(52) U.S. Cl.
CPC .............. *F25J 3/0223* (2013.01); *F25J 3/0252* (2013.01); *F25J 3/0257* (2013.01); *F25J 3/0261* (2013.01); *F25J 2205/04* (2013.01); *F25J 2205/30* (2013.01); *F25J 2245/02* (2013.01); *F25J 2280/02* (2013.01)

(58) Field of Classification Search
USPC ........................................................ 423/418.2
See application file for complete search history.

(56) References Cited

U.S. PATENT DOCUMENTS

| | | | | |
|---|---|---|---|---|
| 2,729,954 | A * | 1/1956 | Etienne | 62/643 |
| 4,478,621 | A | 10/1984 | Fabian | |
| 4,784,677 | A * | 11/1988 | Al-Chalabi | 62/656 |
| 5,609,040 | A * | 3/1997 | Billy et al. | 62/622 |
| 5,682,767 | A * | 11/1997 | De Bussy et al. | 62/648 |
| 2002/0140932 | A1* | 10/2002 | Satou et al. | 356/311 |
| 2007/0033967 | A1* | 2/2007 | Briglia | 62/617 |

OTHER PUBLICATIONS

Berninger, R., "Fortschritte Bei Der H2/CO-Tieftemperaturzerlegung Progress in H2/CO Low Termperature Separation" Berichte Aus Technik Und Wissenschaft, Linde AG, Unternehmenszentrale, Unternehmenskommunikation, Wie, De, vol. 62, 1988, p. 18-32, XP009045782, Figures 3,6.
Search Report for PCT/FR2008/050147.

* cited by examiner

*Primary Examiner* — Melvin C Mayes
*Assistant Examiner* — Kenneth Vaden
(74) *Attorney, Agent, or Firm* — Justin K. Murray

(57) ABSTRACT

A method and an apparatus for producing carbon dioxide by cryogenic distillation is provided.

8 Claims, 1 Drawing Sheet

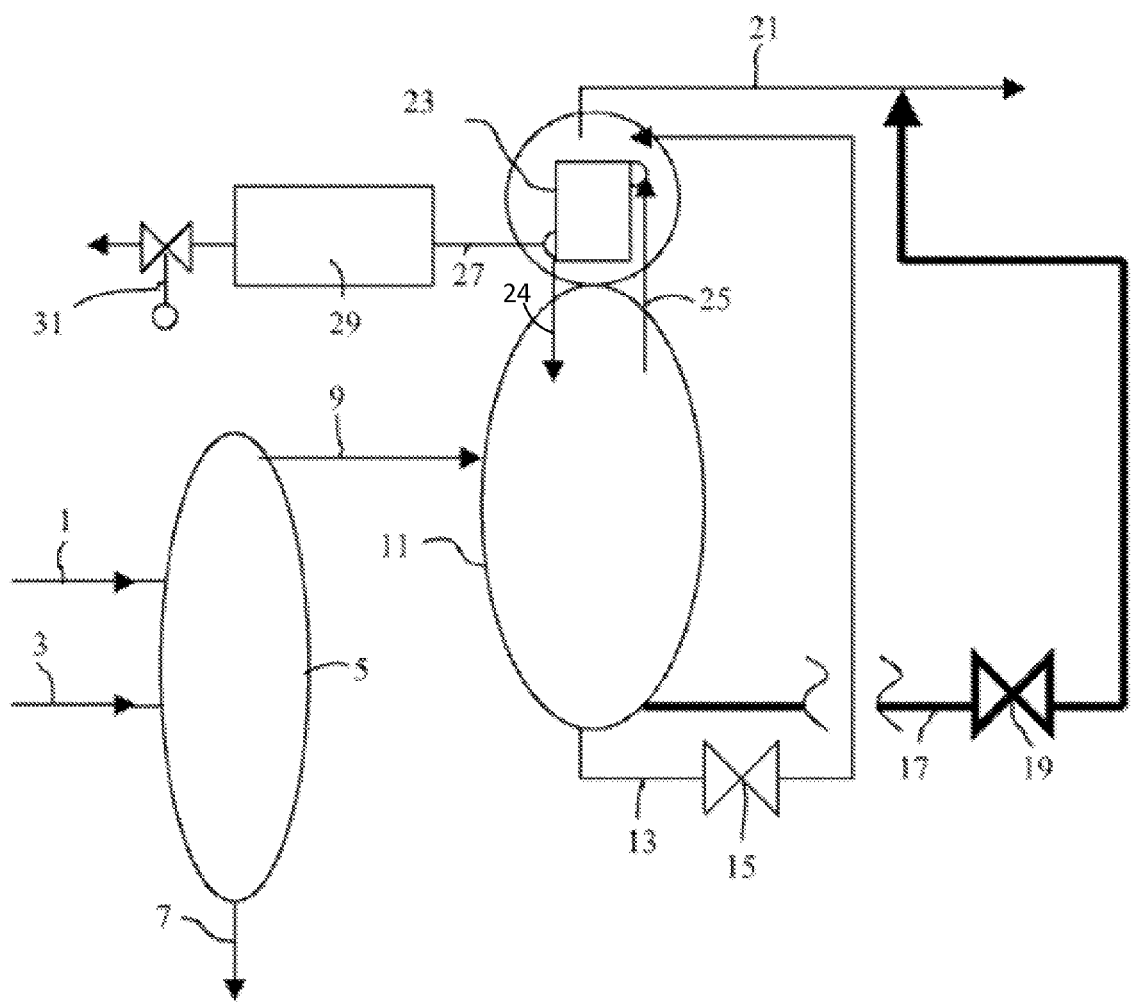

METHOD AND APPARATUS FOR PRODUCING CARBON MONOXIDE BY CRYOGENIC DISTILLATION

This application is a §371 of International PCT Application PCT/FR2008/050147, filed Jan. 30, 2008.

FIELD OF THE INVENTION

Background

The present invention relates to a method and an apparatus for producing carbon monoxide by cryogenic distillation. In known methods for producing hydrogen and/or carbon monoxide by cryogenic distillation, use is frequently made of a denitrogenation column in order to obtain products that are very low in nitrogen from a mixture to be separated that is contaminated with nitrogen.

It may however happen that the nitrogen content of the mixture to be separated is extremely low or even zero from time to time, while the unit has been designed with a denitrogenation column. This will thus be the case with a mixture to be separated produced by an SMR, fed temporarily with naphtha. Since regulation of the pressure of the denitrogenation column is made by controlling the nitrogen purge, it will no longer be possible to keep the pressure constant. Since this pressure controls that of the $CO/CH_4$ column generally upstream to the denitrogenation column, the operation of the unit will be caused to deteriorate considerably by probable fluctuations.

One means of avoiding these problems at relatively little cost consists of installing a new gas outlet on the $CO/N_2$ column, preferably in the vessel, and of connecting it to the low pressure carbon monoxide network. Thus, when the flow rate of the nitrogen purge becomes too low for regulating the pressure, it is sufficient to open the new carbon monoxide outlet and to regulate the pressure by this channel. The nitrogen purge should then be closed.

SUMMARY OF THE INVENTION

According to one object of the invention, a method is provided for producing carbon monoxide by cryogenic distillation using a system of distillation columns fed by a mixture comprising at least hydrogen, carbon monoxide and for at least part of the time nitrogen, in which the mixture to be separated is cooled to a distillation temperature, the mixture is purified from hydrogen, a fluid is separated comprising at least carbon monoxide and at least part of the time nitrogen in a denitrogenation column in order to produce a nitrogen-rich gas and a carbon monoxide-rich liquid and a carbon monoxide-rich gas is withdrawn from the system of columns, characterized in that if the nitrogen content of this fluid comprising at least carbon monoxide and at least part of the time nitrogen falls below a given threshold, a carbon monoxide-rich flow is withdrawn from the denitrogenation column and the pressure of the column is varied by regulating this carbon monoxide-rich flow.

According to one object of the invention, a method is provided for producing carbon monoxide by cryogenic distillation using a system of distillation columns fed by a mixture comprising at least hydrogen, carbon monoxide and for at least part of the time nitrogen, in which the mixture to be separated is cooled to a distillation temperature, the mixture is purified from hydrogen, a fluid is separated comprising at least carbon monoxide and at least part of the time nitrogen in a denitrogenation column in order to produce a nitrogen-rich gas and a carbon monoxide-rich liquid and a carbon monoxide-rich gas is withdrawn from the system of columns, characterized in that if the nitrogen content of this fluid comprising at least carbon monoxide and at least part of the time nitrogen falls below a given threshold, a carbon monoxide-rich flow is withdrawn from the denitrogenation column and the pressure of the column is varied by regulating this carbon monoxide-rich flow. In one embodiment, the nitrogen content of the fluid can be measured.

Preferably, the denitrogenation column has a head condenser, means for conveying a liquid from the vessel of the denitrogenation column to the head condenser, means for withdrawing vaporized vessel liquid vessel from the head condenser and means for mixing the vaporized vessel liquid with the carbon monoxide-rich gas.

BRIEF DESCRIPTION OF THE FIGURES

FIG. 1 illustrates an apparatus for producing carbon dioxide according to one aspect of the present invention.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

The apparatus comprises at least two distillation columns, comprising a $CO/CH_4$ column 5 and a denitrogenation column 11.

The apparatus may form part of an installation with a methane washing step or a partial condensation step upstream to the $CO/CH_4$ column in order to purify the mixture and separate the hydrogen from it. The denitrogenation column may also be situated upstream of the $CO/CH_4$ column.

The $CO/CH_4$ column fed by two flows 1, 3 at different levels and produces a methane-rich liquid 7 and a fluid 9 carbon monoxide-rich fluid 9 but containing nitrogen, at least from time to time. The fluid 9 is conveyed to the denitrogenation cola 11 in the upper part of the column. The vessel liquid 13, which contains primarily carbon monoxide is flowed across valve 15 and then conveyed to a head condenser 23 of the denitrogenation column 11 so as to condense nitrogen vapor 25. Nitrogen vapor 25, which will have minor amounts of carbon monoxide, is condensed in condenser 23 by thermal contact with the vessel liquid 13 and then reintroduced via line 24 into denitrogenation column 11 as a reflux. A purge flow 27 is withdrawn from the condenser 23 and conveyed to a heat exchanger 29 where it vaporizes and is expanded in a valve 31. The pressure of the denitrogenation column 11 is maintained by means of the purge flow 27.

If the nitrogen content of the flow 9 falls below a given threshold, the pressure of the denitrogenation column 11 can no longer be maintained with the purge flow 27. In this case, a flow of gaseous carbon monoxide 17 is withdrawn from the vessel of the denitrogenation column 11. By regulating the opening of the valve 19, the flow of gaseous carbon monoxide 17 may be varied and thus the pressure of the denitrogenation column 11 and therefore the pressure of the $CO/CH_4$ column 5. Carbon monoxide 17 is optionally mixed with the vaporized liquid 21, which also comprises primarily carbon monoxide, coming from the condenser 23.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The flows 13, 21 and 25 may be zero.

What is claimed is:

1. A method for producing carbon monoxide by cryogenic distillation using a system of distillation columns fed by a mixture comprising at least hydrogen, carbon monoxide and for at least part of the time nitrogen, the method comprising a first operation mode and a second operation mode, wherein in both the first operation mode and the second operation mode, the method comprises the steps of:
   cooling the mixture to be separated to a distillation temperature;
   purifying the mixture of hydrogen to produce a fluid, wherein the fluid comprises carbon monoxide and at least part of the time nitrogen, wherein the fluid has reduced amounts of hydrogen as compared to the mixture;
   introducing the fluid to a denitrogenation column under conditions effective to separate the carbon monoxide from the nitrogen in order to produce a carbon monoxide-rich liquid at the bottom of the denitrogenation column and a nitrogen-rich gas at the top of the denitrogenation column, wherein the nitrogen-rich gas is produced when nitrogen is present within the denitrogenation column;
   withdrawing the carbon monoxide-rich liquid from the denitrogenation column and a vaporized liquid from the system of columns;
wherein in the first operation mode, the method further comprises the step of:
   condensing a portion of the nitrogen-rich gas in a condenser to form condensed nitrogen and returning at least a portion of the condensed nitrogen to the denitrogenation column; and
   regulating the pressure of the denitrogenation column by withdrawing a purge flow of nitrogen from the condensed nitrogen;
wherein in the second operation mode, the method further comprises the step of:
   regulating the pressure of the denitrogenation column by withdrawing a carbon monoxide-rich gaseous flow from the denitrogenation column,
wherein the method switches from the first operation mode to the second operation mode when the pressure of the denitrogenation column cannot be maintained by withdrawing the purge flow of the nitrogen from the condensed nitrogen.

2. The method of claim 1, wherein the method further comprises the step of measuring the nitrogen content of the fluid comprising carbon monoxide and at least part of the time nitrogen.

3. The method of claim 1, further comprising the step of thermally contacting the withdrawn carbon monoxide-rich liquid with vaporized nitrogen from the denitrogenation column in a head condenser, such that the vaporized nitrogen condenses and the withdrawn carbon monoxide-rich liquid absorbs heat.

4. The method of claim 3, wherein the vaporized liquid withdrawn in the step of withdrawing the carbon monoxide-rich liquid and the vaporized liquid from the system of columns is formed during the step of thermally contacting the withdrawn carbon monoxide-rich liquid with vaporized nitrogen.

5. A method for producing carbon monoxide by cryogenic distillation using a system of distillation columns fed by a mixture comprising at least hydrogen, carbon monoxide and for at least part of the time nitrogen, the method comprising the steps of:
   cooling the mixture to be separated to a distillation temperature;
   purifying the mixture of hydrogen to produce a fluid, wherein the fluid comprises carbon monoxide and at least part of the time nitrogen, wherein the fluid has reduced amounts of hydrogen as compared to the mixture;
   separating the fluid comprising at least carbon monoxide and at least part of the time nitrogen in a denitrogenation column in order to produce a nitrogen-rich gas at the top of the denitrogenation column when nitrogen is present in the denitrogenation column and a carbon monoxide-rich liquid at the bottom of the denitrogenation column;
   withdrawing the carbon monoxide-rich liquid from the system of columns;
   condensing a portion of the nitrogen-rich gas in a condenser to form condensed nitrogen and returning at least a portion of the condensed nitrogen to the denitrogenation column;
   regulating the pressure of the denitrogenation column by withdrawing a nitrogen purge flow from the condensed nitrogen; and
   regulating the pressure of the denitrogenation column by withdrawing a carbon monoxide-rich gaseous flow from the denitrogenation column upon a condition in which the nitrogen content of the fluid comprising at least carbon monoxide and at least part of the time nitrogen is below a value at which the pressure of the denitrogenation column cannot be regulated by the withdrawal of the nitrogen purge flow.

6. The method of claim 5, wherein the method further comprises the step of measuring the nitrogen content of the fluid comprising at least carbon monoxide and at least part of the time nitrogen.

7. The method of claim 5, further comprising the step of controlling the pressure within the denitrogenation column by regulating the flow rate of the carbon monoxide-rich gaseous flow from the denitrogenation column.

8. The method of claim 5, further comprising the step of adjusting the flow rate of the carbon monoxide-rich gaseous flow from the denitrogenation column.

* * * * *